United States Patent [19]

Pitts et al.

[11] Patent Number: 4,749,427

[45] Date of Patent: Jun. 7, 1988

[54] METHOD OF BINDING AND REINFORCING LOOSE LEAF SHEETS

[75] Inventors: Warren R. Pitts, Needham, Mass.; Dennis R. Benoit, Woonsocket, R.I.

[73] Assignee: Dennison Manufacturing Company, Framingham, Mass.

[21] Appl. No.: 905,826

[22] Filed: Sep. 10, 1986

[51] Int. Cl.[4] .......................... B65C 1/00; B32B 31/00; B42F 13/06; B42C 9/00

[52] U.S. Cl. .......................... 156/212; 156/216; 156/249; 402/14; 412/8; 412/901; 428/40

[58] Field of Search .................. 402/7, 14, 15, 18, 500, 402/62; 412/7, 8, 901; 281/24, 21 R, 22, 23, 28; 40/629, 630, 20 R, 20 A, 401, 403, 404, 405; 428/41, 40; 156/212, 216, 217, 289, 230, 239, 249, 247

[56] References Cited

U.S. PATENT DOCUMENTS

| | | | |
|---|---|---|---|
| 399,737 | 3/1889 | Brown | 402/62 |
| 999,285 | 8/1911 | Williams | 402/14 |
| 3,669,555 | 6/1972 | Holes et al. | 402/500 |
| 4,039,046 | 8/1977 | D'Luhy . | |
| 4,113,906 | 9/1978 | Brandwein | 156/249 |
| 4,274,906 | 6/1981 | Clar | 156/249 |
| 4,337,881 | 7/1982 | Off et al. | 156/216 |
| 4,437,781 | 3/1984 | Weihe et al. | 402/15 |

FOREIGN PATENT DOCUMENTS

| | | | |
|---|---|---|---|
| 834505 | 2/1970 | Canada . | |
| 2355801 | 5/1975 | Fed. Rep. of Germany . | |
| 2853963 | 7/1978 | Fed. Rep. of Germany | 402/14 |
| 248221 | 1/1948 | Switzerland | 402/14 |
| 2047656 | 12/1980 | United Kingdom | 156/249 |

*Primary Examiner*—Donald E. Czaja
*Assistant Examiner*—Louis Falasco
*Attorney, Agent, or Firm*—George E. Kersey

[57] ABSTRACT

Method of binding loose leaf sheets together having multiple superposed punched holes while reinforcing the holes including providing a binding element having a tab portion and an elongated strip portion, affixing the tab portion to a face portion of one of the sheets and passing the strip portion through superposed holes within the sheets to be bonded at least once to bind the sheets together, and repeating the process for the remaining holes.

25 Claims, 4 Drawing Sheets

FIG. 1
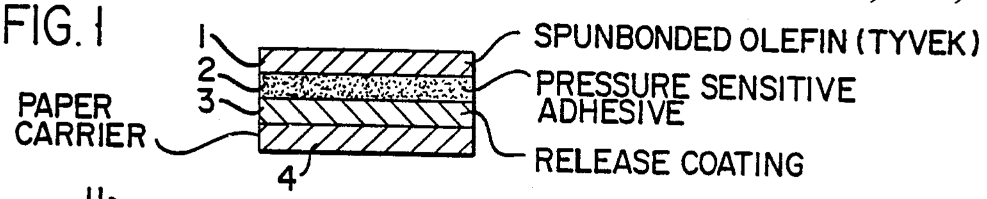
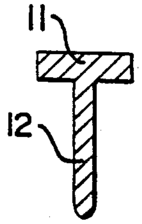
FIG. 2
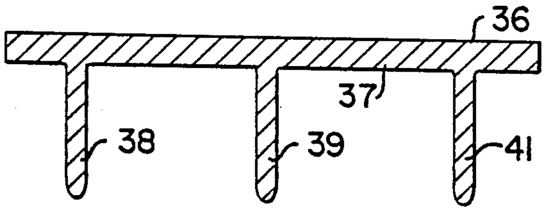
FIG. 11
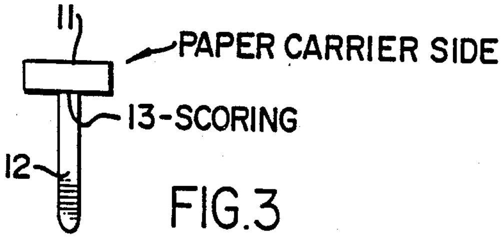
FIG. 3
FIG. 14
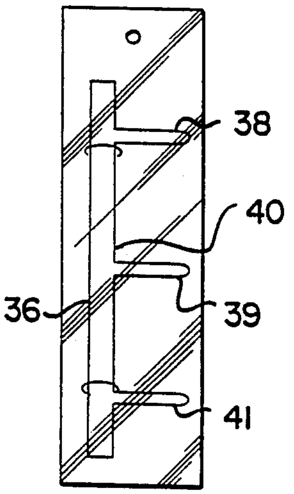
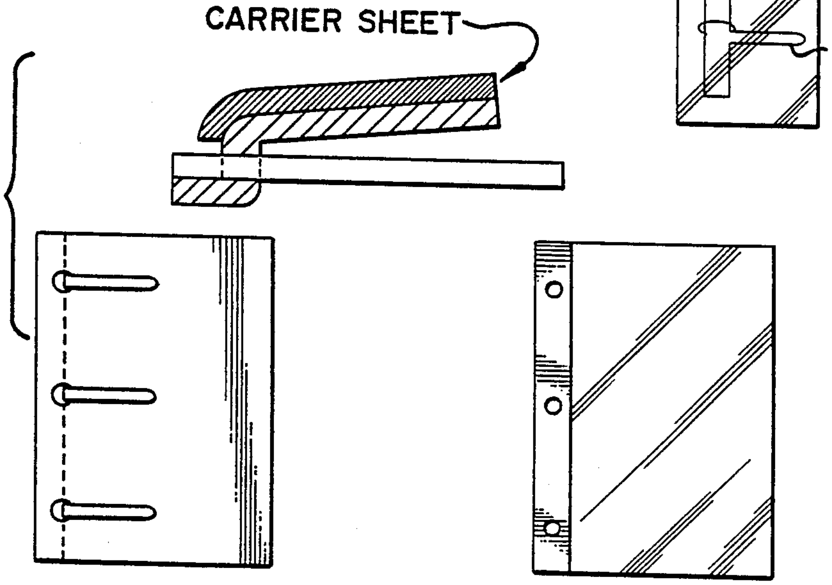
FIG. 5'

FIG. 6'
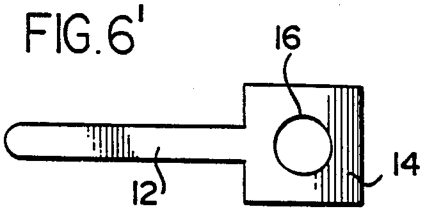
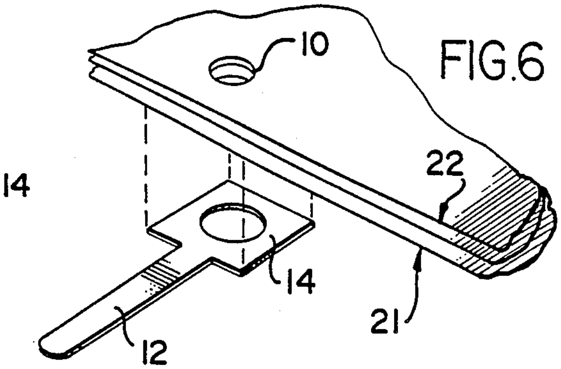
FIG. 6
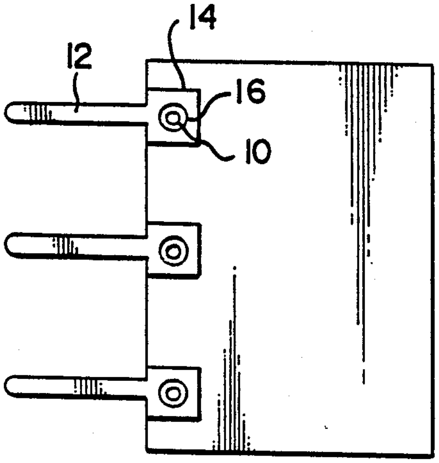
FIG. 8
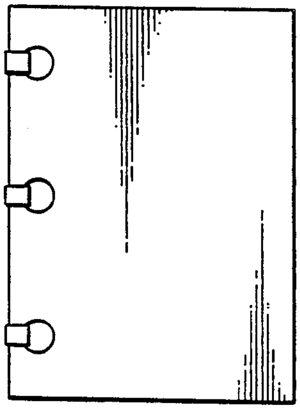
FIG. 7
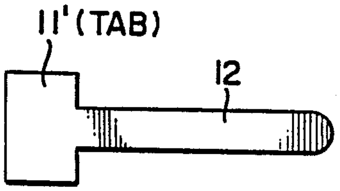
FIG. 4
FIG. 5
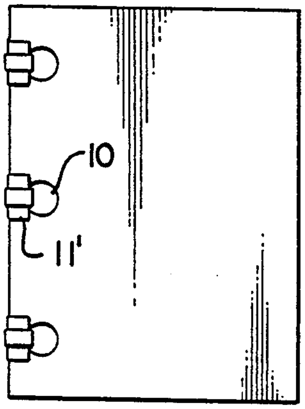

FIG. 9
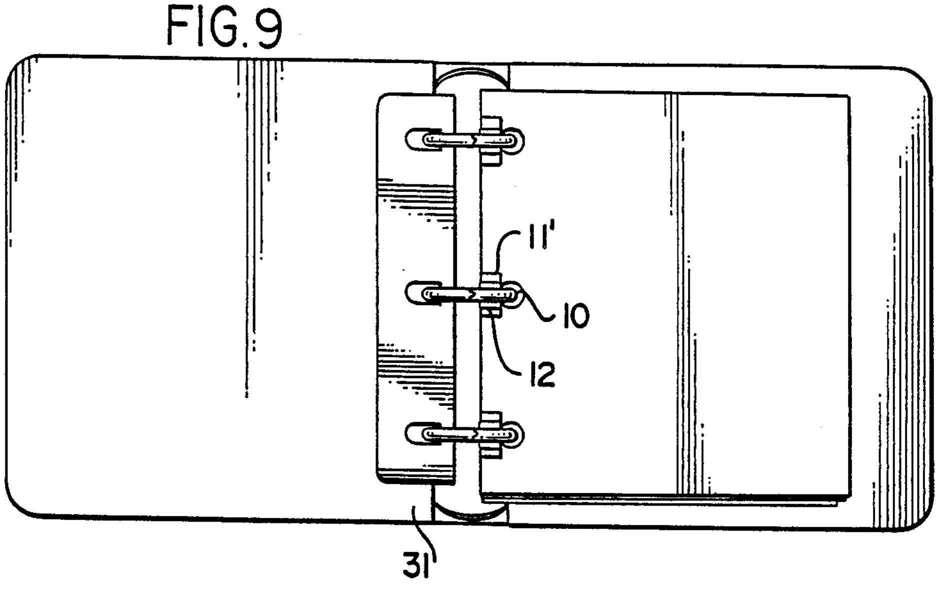
FIG. 10
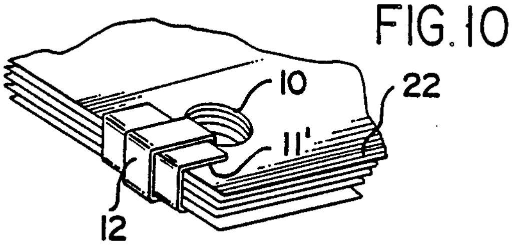
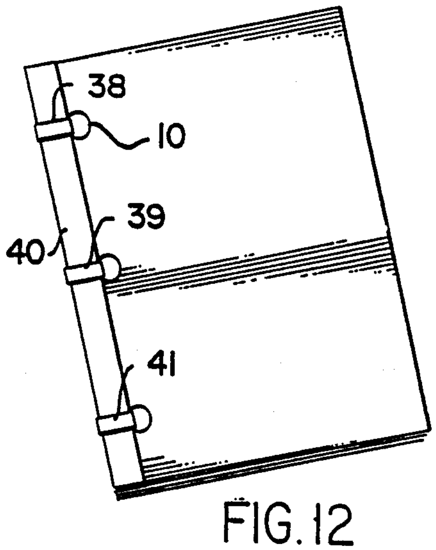
FIG. 12
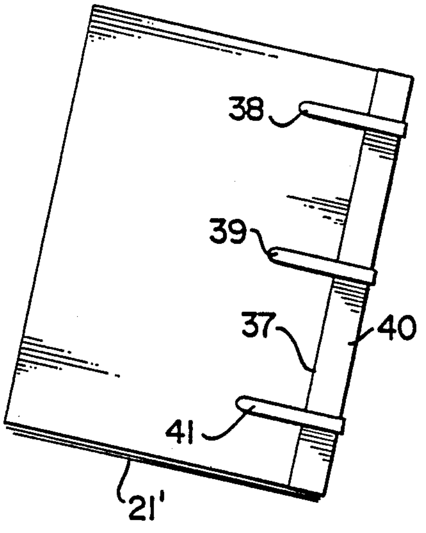
FIG. 13

METHOD OF BINDING AND REINFORCING LOOSE LEAF SHEETS

BACKGROUND OF THE INVENTION

The present invention relates to the field of loose leaf binders.

Loose leaf binders have been employed for many years to contain punched paper sheets therein, often having gummed reinforcements which are affixed to the sheets about each punched hole in each sheet. Where a substantial number of sheets are utilized it is somewhat time consuming to apply a gummed reinforcement to each hole in each punched sheet contained within the loose leaf binder. Furthermore, it is often desirable to remove a group of sheets from the loose leaf binder and to keep the group together to form an individual file. In order to do this, the user typically would apply a paper clip to a group of such sheets removed from the loose leaf binder to hold the group together. However, the paper clips can be inadvertently removed and papers could be misplaced. Another approach would be to staple the sheets together. However, upon replacing the group of sheets back into the loose leaf binder the staples would normally have to be removed to enable the sheets to be flipped or turned over within the binder.

It is thus a principal object of the present invention to apply inexpensive binding members to the punched holes within the sheets to bind them together into a group, so that one or more sheets do not become separated from the rest of the group, and at the same time to eliminate the need for the circular, often gummed reinforcements generally applied to the holes in the punched sheets to prevent them from being torn at the sheet edge portions in the ring binder.

SUMMARY OF PREFERRED EMBODIMENTS OF THE INVENTION

In accordance with a first embodiment of the invention, a multi-layered binding element having a tab portion and an elongated strip portion is provided, a carrier layer is removed from the strip portion to expose a pressure sensitive adhesive, the strip portion is thereafter thrust through superposed punched holes formed within the aforesaid stack of loose leaf sheets, and is wrapped about edge portions of the sheets between the punched holes and the edges of the sheets. In the case of a group of sheets having three sets of superposed holes, this process is repeated with respect to the second and third sets of superposed punched holes. The result is that a group of sheets has been bound together to advert the need for utilizing separate fasteners and at the same time the binding elements eliminate the need for applying gummed reinforcements to each hole in each sheet. The group of bound documents may be removed from the loose leaf binder and at a later time may be reinserted into the binder to be stored therein.

In another embodiment, the pressure sensitive adhesive of the tab portion may also be exposed to cause the entire tab portion to be stuck or affixed to the face portion of the sheets. A hole is provided in the tab which is larger than the corresponding holes within the loose leaf sheets, to enable the holes to be easily aligned. In another embodiment of the invention, a unitary tab portion is provided, whereby the aforesaid tabs form a unitary portion and typically three strip portions extend from the unitary tab portion, separated by a distance equal to the separation distance between the punched holes in the paper.

BRIEF DESCRIPTION OF THE DRAWINGS

FIG. 1 is a cross-section of the binding element.

FIG. 2 is a single-hole binding element.

FIG. 3 is a further view of FIG. 2.

FIG. 4 is a alternative portion of FIG. 2.

FIG. 5 shows sheets bound with the element of FIG. 4.

FIG. 5' illustrates one mode of applying a binder element.

FIG. 6 is an alternative binding element shown with a fragmentary set of sheets.

FIG. 6' is another view of the binding element of FIG. 6.

FIG. 7 is a top view of bound sheets.

FIG. 8 shows a bottom sheet together with binding element of FIG. 6'.

FIG. 9 shows bound sheets inserted in a note book.

FIG. 10 shows details of one of the binding elements of FIG. 9.

FIG. 11 is a three hole binding element.

FIG. 12 is a set of sheets bound with element of FIG. 11.

FIG. 13 illustrates an alternative use of the element in FIG. 11.

FIG. 14 illustrates storage of the binding element of FIG. 11.

DETAILED DESCRIPTION

Figure 15:
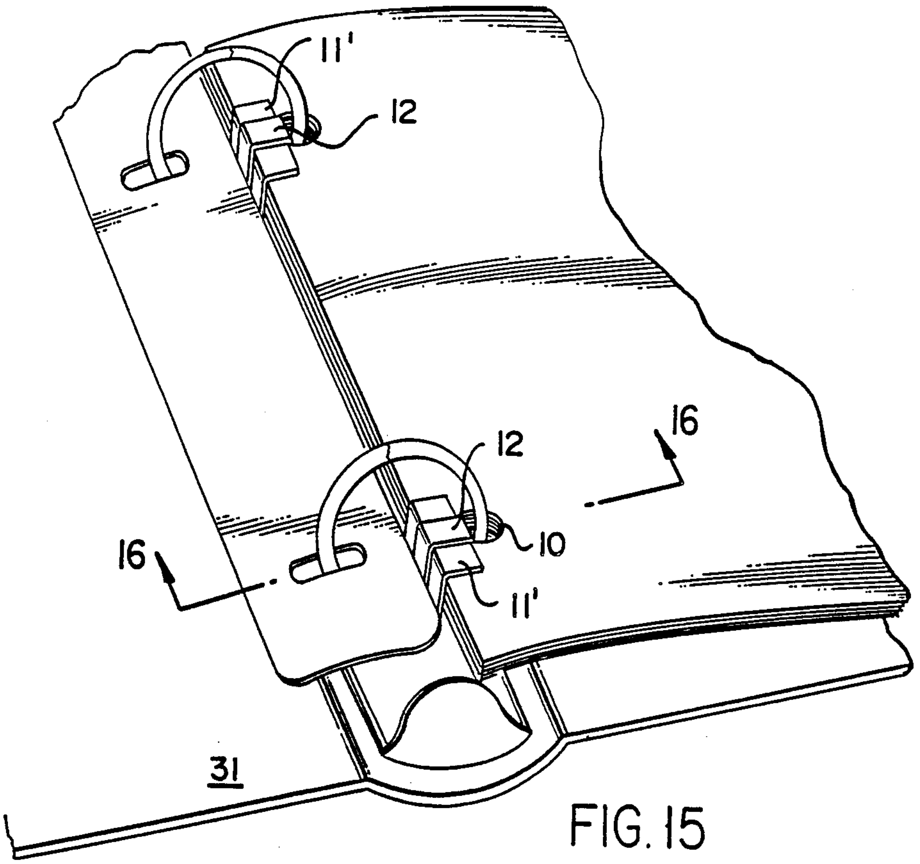
FIG. 15 illustrates bound sheets in a two ring binder.
Figure 16:
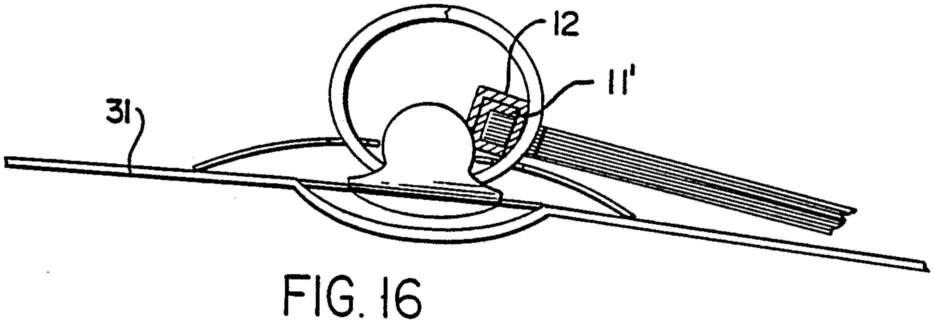
FIG. 16 is a cross-sectional view of FIG. 15.

Referring now to FIG. 1, a first substrate 1 which preferably is made of olefin is illustrated, having a second pressure sensitive adhesive layer 2 mounted thereon. Layer 2 is protected by a third layer of a paper carrier sheet 4, having a release coating 3 thereon. Since these components are well known to those skilled in the art, further details have been omitted. A single hole multi-layered binding element is illustrated in FIG. 2 having a tab portion 11 and an elongated strip portion 12 affixed threreto. The binding elements of this invention are all preferably multi-layered in the manner illustrated in FIG. 1. In FIG. 3, scoring 13 is produced upon manufacture at the interface between tab portion 11 and elongated strip portion 12. The user separates paper carrier 4 from the above mentioned first and second layers by peeling paper carrier 4 away from the elongated strip portion, to expose the pressure sensitive adhesive upon the strip portion. On the other hand, paper carrier substrate 4 may remain on tab portion 11 so that the binding element may be easily handled by the user without having it stick to the user's fingers.

In FIG. 4, a single hole binding element is illustrated having a somewhat enlarged head or tab portion 11'. After the user separates the paper carrier 4 from strip portion 12 by peeling the paper carrier away, tab portion 11' is folded about edge portion 15 of the stack of loose leaf sheets to be bound together as illustrated in FIGS. 5 and 10-*a*. The user thereafter passes the strip portion 12 through the superposed holes 10 of the stacked sheets at least once, and thus the exposed pressure sensitive adhesive upon strip portion 12 causes the strip portion to be adhered or affixed to tab portion 11' to bind the loose leaf sheets together as illustrated in FIGS. 5 and 10-*a*.

In FIG. 6, a single hole binding element is illustrated having an enlarged tab portion 14 which a hole 16 formed therein having a diameter somewhat greater than then diameter of the punched holes 10 within the loose leaf sheets. Tab 14 is positioned by the user against the face of bottom sheet 21, and the elongated strip portion is passed through hole 10 one or more times, to bind sheets 21 and 22 together. In this arrangement, the carrier sheet may be optionally separated from both elongated strip portion 12 and enlarged tab portion 14 to facilitate initially affixing or sticking the tab portion to the lower portion of bottom sheet 21. Since hole 16 in tab portion 14 is somewhat larger than the punched holes 10 in the sheets being bound, no tab alignment problems will result. FIG. 7 illustrates a top view of the sheets after three binding members are applied thereto and FIG. 8 illustrates a view of the bottom sheet 21 having three of the binding elements of FIG. 6 affixed thereto before the strips are passed through the holes to bind the three holed stack of sheets together. In FIG. 7 it may be noted that the tabs are invisible utilizing the binding elements of FIG. 6, whereas the tabs are visible as indicated in FIG. 5 after utilizing the binding element of FIG. 4.

FIG. 10 illustrates a stack of sheets after the binding process has been completed, mounted within a ring binder 31. Thus it should be appreciated that in accordance with the present invention, a bound section of documents results, which may be readily positioned within a ring binder. The method of the invention provides the additional beneficial result, that since the binding elements themselves forms a reinforcement device, conventional circular reinforcement members may be omitted if desired.

In FIG. 11, a multiple hole binding element 36 is illustrated, having a unitary elongated tab portion 37 with three elongated strip portions 38, 39, and 41 extending therefrom. The unitary tab portion 37 of FIG. 11 may be aligned with edge portion 40 of the top sheet of FIG. 12, which illustrates a view of the top sheet of the bonded stack, whereas FIG. 13 illustrates the bonded stack viewed from the bottom sheet. Strip portions 38, 39, and 41 are passed through their corresponding punched holes and wound around the edge portions of the sheets. The strip portions are again passed from the bottom through the top of the stack of sheets and wound about the edge portion 40 one or more times, and thereafter affixed to the bottom face of the lower sheet 21' along a substantial portion of the sheet 41 as illustrated in FIG. 13. In this method of utilizing the invention, the holes would be covered by strip portions 38, 39, and 41 illustrated in FIG. 13. Thus the resulting bound stack would be utilized as a unitary file of documents, but would not be mounted within ring binder 31 as illustrated in FIG. 10, since the elongated tabs 38, 39, and 41 together with unitary strip 37 would cover the punched holes. Optionally, the carrier sheet 4 could be removed from the unitary tab 37 in addition to the elongated strip portions, and thus the binder element of FIG. 11 could be manufactured without a paper carrier 4, and could be affixed to a storage card 40 illustrated in FIG. 14 by means of adhesive layer 2. With this arrangement the user could peel away the entire multi-hole strip from the storage card, and need not peel away the individual paper carrier portions 4 from the elongated strip elements.

If after the strip portions are passed through the holes a couple of times a terminal portion of the strip remains, in the case of a thin stack of sheets, the user could merely snip it off with a scissor or could continue to pass it through the holes.

Other variations of the aforesaid steps and elements may be practised within the scope of the invention which is to be limited only by a reasonable interpretation of the language of the following claims.

What is claimed is:

1. Method of binding a plurality of sheets together having multiple superposed punched holes within edge portions thereof while reinforcing said holes comprising the steps of:

(a) providing a multi-layered binding element having a tab portion and an elongated strip portion, said binding element including a first substrate layer, a pressure sensitive adhesive layer and a carrier layer having a release coating thereon affixed to said pressure sensitive layer;

(b) peeling away said carrier layer from said elongated strip portion and said tab portion to expose said adhesive layer;

(c) affixing said tab portion to a face portion of one of said sheets; and (d) passing said strip portion through substantially superposed holes within said sheets to be bonded at least once while pressing said pressure sensitive layer of said strip portion against said tab portion to affix said strip portion thereto, to bind said sheets together at edge portions thereof.

2. The method of claim 1 wherein said tab portion has a tab hole therein larger than holes within said sheets and further including the step of aligning said tab hole with the holes within said sheets during the performance of step (c).

3. The method of claim 1 wherein the terminal portion of said strip portion not passed through said hole is affixed directly to a substantial face portion of one of said sheets.

4. The method of claim 2 wherein the terminal portion of said strip portion not passed through said hole is affixed directly to a substantial face portion of one of said sheets.

5. The method of claim 1 wherein a plurality of tab portions having strip portions affixed thereto, are joined together to form a unitary elongated tab portion for binding multiple hole sheets together.

6. The method of claim 2 wherein a plurality of tab portions having strip portions affixed thereto, are joined together to form a unitary elongated tab portion for binding multiple hole sheets together.

7. The method of claim 3 wherein a plurality of tab portions having strip portions affixed thereto, are joined together to form a unitary elongated tab portion for binding multiple hole sheets together.

8. The method of claim 4 wherein a plurality of tab portions having strip portions affixed thereto, are joined together to form a unitary elongated tab portion for binding multiple hole sheets together.

9. The method of claim 2 wherein at least two holes are punched within each of said sheets and further including the step of inserting said sheets into a ring binder after the performance of step (c) upon said holes to provide a bound section of documents within said ring binder having reinforced holes without the need for applying reinforcement members.

10. The method of claim 4 wherein at least two holes are punched within each of said sheets and further including the step of inserting said sheets into a ring binder after the performance of step (c) upon said holes to provide a bound section of documents within said ring binder having reinforced holes without the need for applying reinforcement members.

11. The method of claim 6 wherein at least two holes are punched within each of said sheets and further including the step of inserting said sheets into a ring binder after the performance of step (c) upon said holes to provide a bound section of documents within said ring binder having reinforced holes without the need for applying reinforcement members.

12. The method of claim 1 wherein step (b) is performed during manufacture, and said layer is affixed to a storage card to be supplied to the user.

13. The method of claim 2 wherein step (b) is performed during manufacture, and said layer is affixed to a storage card to be supplied to the user.

14. The method of claim 4 wherein step (b) is performed during manufacture, and said layer is affixed to a storage card to be supplied to the user.

15. The method of claim 6 wherein step (b) is performed during manufacture, and said layer is affixed to a storage card to be supplied to the user.

16. Method of binding a plurality of sheets together having superposed punched holes within edge portions thereof while reinforcing said holes comprising the steps of:

(a) providing a multi-layered binding element having a tab portion and an elongated strip portion, said binding element including a first substrate layer, a pressure sensitive adhesive layer and a carrier layer having a release coating thereon affixed to said pressure sensitive layer;

(b) peeling away said carrier layer from said elongated strip portion to expose said adhesive layer;

(c) thereafter passing said strip portion through substantially superposed holes within said sheets to be bonded at least once while pressing said pressure sensitive layer of said strip portion against said tab portion to affix said strip portion thereto, to bind said sheets together at edge portions thereof.

17. The method of claim 16 wherein the terminal portion of said strip portion not passed through said hole is affixed directly to a substantial face portion of one of said sheets.

18. The method of claim 16 wherein a plurality of tab portions having strip portions affixed thereto, are joined together to form a unitary elongated body for binding multiple hole sheets together.

19. The method of claim 17 wherein a plurality of tab portions having strip portions affixed thereto, are joined together to form a unitary elongated body for binding multiple hole sheets together.

20. The method of claim 16 wherein said carrier layer is scored at the interface between said tab portion and said strip portion to enable said carrier layer to be readily peeled away from said strip portion but not said tab portion to provide ease of handling of said tab portion.

21. The method of claim 17 wherein said carrier layer is scored at the interface between said tab portion and said strip portion to enable said carrier layer to be readily peeled away from said strip portion but not said tab portion to provide ease of handling of said tab portion.

22. The method of claim 18 wherein said carrier layer is scored at the interface between said tab portion and said strip portion to enable said carrier layer to be readily peeled away from said strip portion but not said tab portion to provide ease of handling of said tab portion.

23. The method of claim 19 wherein said carrier layer is scored at the interface between said tab portion and said strip portion to enable said carrier layer to be readily peeled away from said strip portion but not said tab portion to provide ease of handling of said tab portion.

24. The method of claim 16 wherein at least two holes are punched within each of said sheets and further including the step of inserting said sheets into a ring binder after the performance of step (c) to provide a bound section of documents within said ring binder having reinforced holes without the need for applying reinforcement members.

25. The method of claim 16 wherein step (b) is performed during manufacture, and said adhesive layer is affixed to a storage card to be supplied to the user.

* * * * *